(12) United States Patent
Ragucci

(10) Patent No.: US 10,715,728 B1
(45) Date of Patent: Jul. 14, 2020

(54) SUB-FRAME JITTER COMPENSATION

(71) Applicant: Raytheon Company, Waltham, MA (US)

(72) Inventor: Anthony J. Ragucci, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/259,063

(22) Filed: Jan. 28, 2019

(51) Int. Cl.
*H04N 5/232* (2006.01)

(52) U.S. Cl.
CPC ....... *H04N 5/2327* (2013.01); *H04N 5/23258* (2013.01)

(58) Field of Classification Search
CPC .......... H04N 5/2327; H04N 5/23258
See application file for complete search history.

(56) References Cited

U.S. PATENT DOCUMENTS

| | | | |
|---|---|---|---|
| 8,605,853 B2 | 12/2013 | Schultz et al. | |
| 8,908,053 B2 | 12/2014 | Molgaard | |
| 9,159,446 B2 | 10/2015 | Schultz et al. | |
| 9,407,820 B2 | 8/2016 | Black et al. | |
| 9,768,785 B2 | 9/2017 | Schultz et al. | |
| 2010/0188504 A1* | 7/2010 | Dimsdale | G01C 11/06 348/142 |
| 2015/0116564 A1 | 4/2015 | Williams | |
| 2016/0041266 A1* | 2/2016 | Smits | G01S 7/4863 356/5.01 |
| 2016/0356890 A1* | 12/2016 | Fried | G01S 17/42 |
| 2018/0343406 A1 | 11/2018 | Ikedo | |
| 2020/0053286 A1* | 2/2020 | Corona | H04N 5/23267 |

OTHER PUBLICATIONS

A. Karpenko, D. Jacobs, J. Baek, M. Levoy, "Digital Video Stabilization and Rolling Shutter Correction using Gyroscopes," Stanford Tech Report CSTR, Mar. 2011.
Brown, Matthew G. et al. "Digital-pixel focal plane array development." Quantum Sensing and Nanophotonic Devices VII., San Francisco, California, USA: SPIE, 2010. 11 pages.
Fischer, et al. "Integrating MEMS and ICs" Microsystems &Nanoengineering (2015) 1, 15005, 16 pages.

(Continued)

*Primary Examiner* — Mekonnen D Dagnew
(74) *Attorney, Agent, or Firm* — Cantor Colburn LLP

(57) ABSTRACT

An imaging detector includes an image detection device that includes an array of digital pixels, each digital pixel including an output that provides a pulse each time a charged stored in the digital pixel exceeds a threshold, an accelerometer connected to the image detection device, and a readout integrated circuit (ROIC) connected to the accelerometer and connected to the output of each of the digital pixels and that receives pulses from each pixel. The ROIC includes a plurality of accumulators. Each of the plurality of accumulators associated with a respective digital pixel is configured to receive a pulse from a first digital pixel of the array of digital pixels and to assign the received pulse to an accumulator associated with another digital pixel of the array based on information received from the accelerometer.

20 Claims, 5 Drawing Sheets

(56) References Cited

OTHER PUBLICATIONS

K.I. Schultz, M.W. Kelly, J.J Baker, M.H. Blackwell, M.G. Brown, C.B. Colonero, C.L. David, B.M. Tyrrell, J.R. Wey, "Digital-Pixel Focal Plane Array Technology," Lincoln Laboratory Journal, vol. 20, No. 2, 2014, pp. 36-51.
La Rosa, Fabrizio, et al. "Optical Image Stabilization (OIS)" Optical Image Stabilization (OIS)—White Paper, 26 pages.
Schultz et al, "A Review of: Digital-Pixel Focal Plane Array Technology" MIT Lincoln Laboratory Journal 2014 (Matt Salem/ Oct. 29, 2016) 7 pages.
Schultz, et al. "Digital-Pixel Focal Plane Array Technology" Lincoln Laboratory Journal vol. 20, No. 2, 2014, 16 pages.
Sprafke, et al. "High Performance Infrared Focal Plane Arrays", Optics & Photonics News, vol. 19, No. 6., Jun. 2008, 7 pages.
Notification of Transmittal of the International Search Report of the International Searching Authority, or the Declaration; PCT/US2020/013597; dated Mar. 20, 2020, 5 pages.
Notification of Transmittal of the Written Opinion of the International Searching Authority, or the Declaration; PCT/US2020/013597; dated Mar. 20, 2020, 8 pages.

* cited by examiner

SUB-FRAME JITTER COMPENSATION

BACKGROUND

The present disclosure relates to a digital pixel imager and, in particular, a system that compensates for motion between optics and the focal plane array, including a per-pixel bias control.

In legacy analog imagers, particularly infrared imagers, photo-current from a detector diode is integrated by a well or integration capacitor coupled to the detector diode, and then once per video frame, the voltage or charge of the well capacitor is transferred to a down-stream analog-to-digital converter (ADC), where the voltage is converted to a binary value.

One type of in-pixel ADC circuit utilizes an injection transistor such as a direct injection (DI) transistor or a buffered direct injection (BDI) transistor. In such circuits, charge from a photo-diode is accumulated on an integration capacitor during an integration period. When the end of the period is reached, the charge stored in the integration capacitor is provided to a readout circuit. Such circuits can either integrate then read or read while integrating circuits.

Line-of-sight jitter on an analog imager causes blur or effective reduction in modulation transfer function (MTF) performance. Mechanical rigidity between the optics and a focal plane array (FPA) is necessary but may not be sufficient to prevent relative motion. As such, in some cases, a relative movement between the optics and the FPA can lead to scene projection changes. For example, vibration of a vehicle, aircraft, or other platform carrying the imager can lead to scene projection changes on the FPA within the single-frame integration period. Because analog imagers average the irradiance on each individual pixel over the integration period for each frame, the scene projected on the FPA during the integration period can be affected. As a result, jitter (or scene projection changes) can only be compensated on a frame-by-frame basis, limited to vibration frequencies <1/(2*integration time) for analog readouts.

SUMMARY

According to one embodiment, an imaging detector is disclosed. In this embodiment, the detector includes: an image detection device that includes an array of digital pixels, each digital pixel including an output that provides a pulse each time a charged stored in the digital pixel exceeds a threshold; an accelerometer connected to the image detection device; and a readout integrated circuit (ROIC) connected to the accelerometer and connected to the output of each of the digital pixels and that receives pulses from each pixel. The ROIC in this embodiment includes a plurality of accumulators, each of the plurality of accumulators associated with a respective digital pixel. In this embodiment, the ROIC is configured to a receive a pulse from a first digital pixel of the array of digital pixels and to assign the received pulse to an accumulator associated with another digital pixel of the array based on information received from the accelerometer.

According to another embodiment, a method of operating an imaging device is disclosed. The method operates an imaging device including: an image detection device that includes an array of digital pixels, each digital pixel including an output that provides a pulse each time a charge stored in the digital pixel exceeds a threshold, an accelerometer connected to the image detection device, and a controller connected to the accelerometer and connected to the output of each of the digital pixels and that receives the pulses from each pixel and that includes a plurality of accumulators, each of the plurality of accumulators associated with a respective digital pixel. The method includes: receiving a digital pixel output from a first digital pixel of the array of digital pixels; and assigning the received digital pixel output to an accumulator associated with another digital pixel of the array based on information received from the accelerometer.

Another embodiment is direction to an imaging detector. The detector includes:

an image detection device that includes an array of digital pixels, each digital pixel including an output that provides a pulse each time a charged stored in the digital pixel exceeds a threshold; an accelerometer connected to the image detection device; and a readout integrated circuit (ROIC). The ROIC includes a controller connected to the accelerometer and connected to the output of each of the digital pixels; and a plurality of accumulators connected to the controller, each of the plurality of accumulators associated with a respective digital pixel. The controller is configured to a receive a pulse from a first digital pixel of the array of digital pixels and to assign the received pulse to an accumulator associated with another digital pixel of the array based on information received from the accelerometer.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
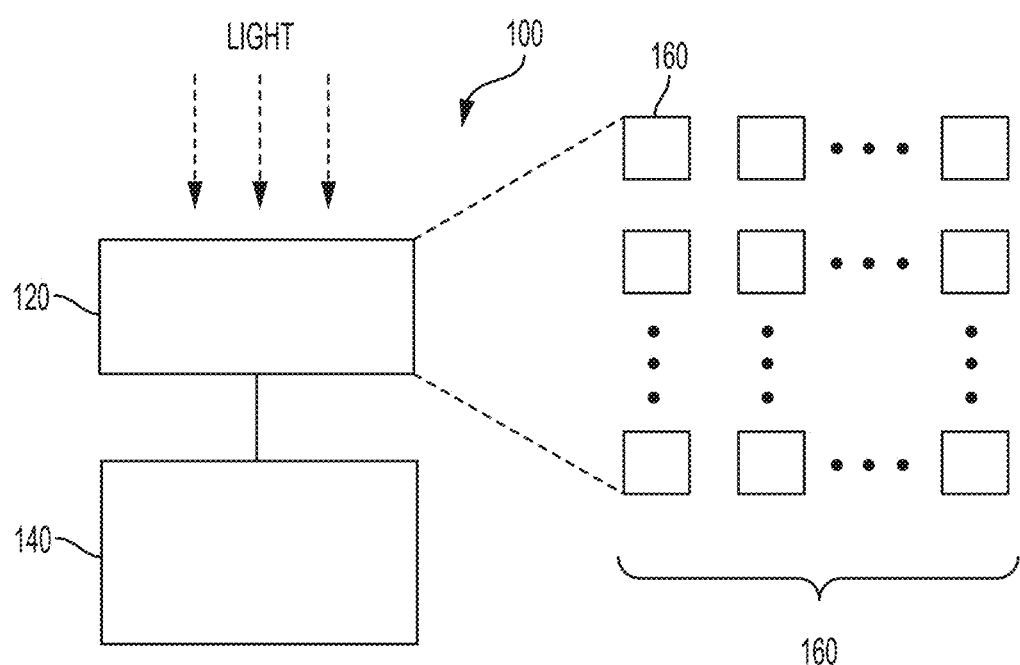
FIG. 1 is a schematic diagram illustrating an image detector in accordance with embodiments.

FIG. 1 is a schematic diagram illustrating an image detector 100 in accordance with embodiments. Such a detector 100 may be deployed, for example, on a satellite or other airborne apparatus such as an aircraft or any land- or sea-based tactical application in which it is a requirement that image acuity not be limited by vibration of the apparatus. Image detector 100 may be a focal plane array (FPA), active pixel sensor (APS) or any other suitable energy wavelength sensing device. The image detector 100 may be used as a component of a photographic and/or image capturing device, such as a digital camera, video camera or other similar device. The image detector 100 may include a detection device 120 and a readout integrated circuit (ROIC) 140.

The detection device 120 includes an array of photosensitive/energy wavelength sensitive detector unit cells 160 arranged in an X×Y matrix. Each of the detector unit cells 160 may accumulate charge or produce a current and/or voltage in response to light incident upon the detector unit cell 160 and may correspond to a pixel in a captured electronic image. One or more of the detector unit cells 160 may include a photovoltaic detector (e.g., a photovoltaic single absorber detector or a photovoltaic multi-absorber (multi-junction) detector), a barrier device detector, a position sensitive detector (PSD) or other suitable detector.

In embodiments herein, each detector unit cell 160 can be a digital pixel that is more fully described below. In general, the detector unit cells 160 will include a photo-diode and circuitry that produces a "count" that is related to the amount of light received by the photo-diode (and a possible residual as well) during an integration frame.

The ROIC 140 may be used for processing of the incident light (e.g., to create an image representative of the incident light). For example, the ROIC 140 interfaces with the detection device 120 to receive a signal, such as the accumulated charge or the current and/or voltage produced in response to light incident upon the detector unit cells 160.

The ROIC 140 may include connections to the counters in each pixel that allow the values stored in the counters to be read out for further processing to form, for example, an image. It shall be understood that FIG. 1 is provided as a general description of how an image detector 100 works and is not meant to be limiting.

In-pixel ADC imagers are used to address decreasing pixel size. In particular, in-pixel ADC imaging improves photo-charge capacity for infrared imaging and other applications as the size of pixels continues to decrease. A good in-pixel ADC design can store nearly all of the available photo-charge from a detector diode and thus improve signal to noise ratio (SNR) to near theoretical limits. A common method of integration for in-pixel ADC circuits uses a quantizing analog front end circuit which accumulates charge over a relatively small capacitor, trips a threshold and is then reset. This pattern is repeated as more photo-current integrates. A pixel so configured is referred to as "digital pixel."

Figure 2:
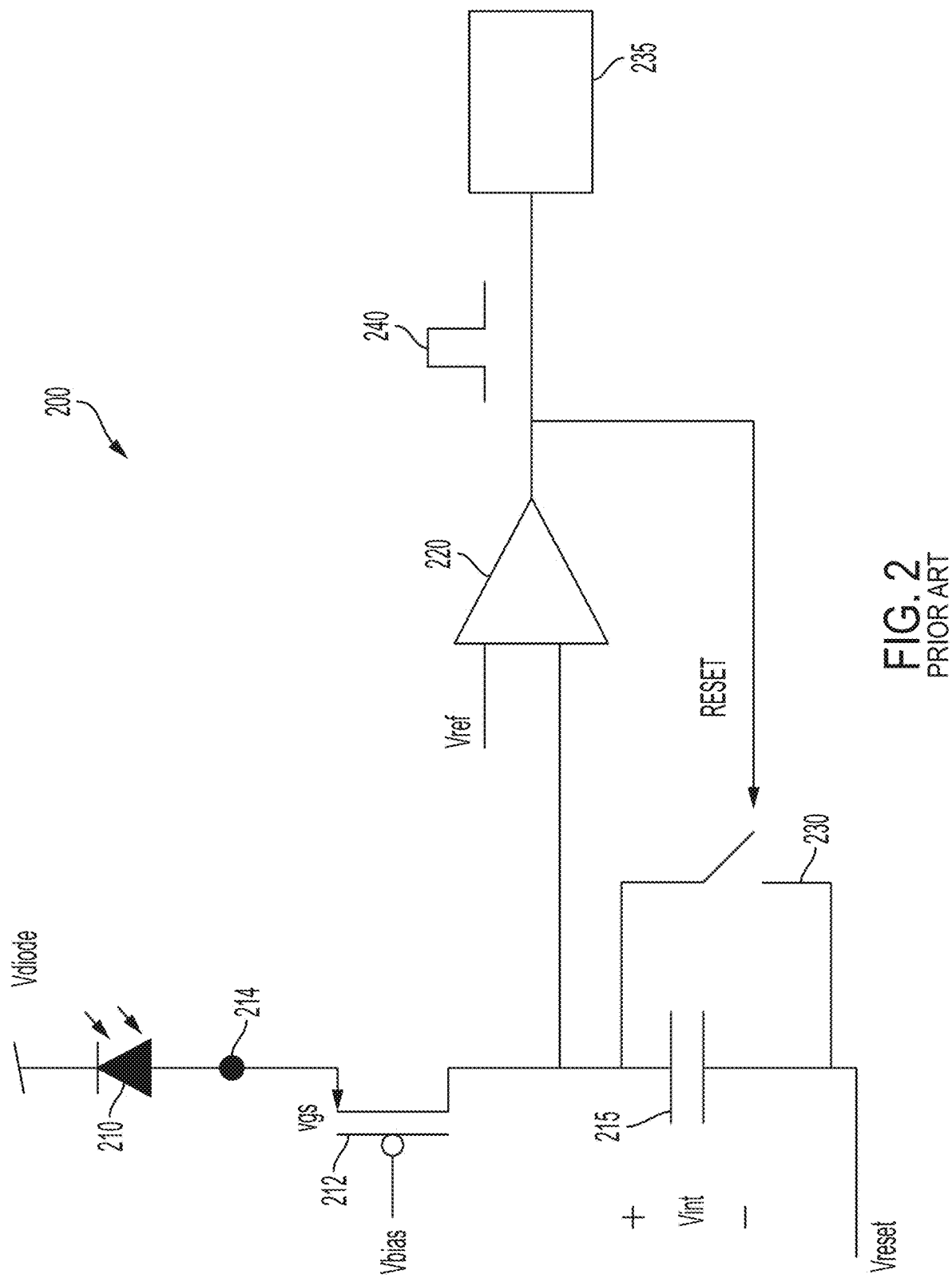
FIG. 2 is a schematic diagram illustrating a digital pixel that includes a counter.

An example of a digital pixel 200 is illustrated in FIG. 2. Charge from a photo-diode 210 (e.g., from a detector unit cell) due to incident energy (e.g., light) is accumulated on an integration capacitor 215. As charge is accumulated on the integration capacitor 215 it is compared to a threshold voltage (Vref) by a comparator 220. When the voltage across the integration capacitor 215 (referred to as Vint herein) exceeds Vref, The capacitor 215 is reset via a reset switch 230 that receives a control signal (Reset) generated by the pulse 240 created by the comparator 220. During a reset, a voltage equal to the difference between Vref and Vreset is subtracted from the integration capacitor 215.

The flow of current from the photo-diode 210 is controlled by an injection transistor 212. The gate of the injection transistor 212 is coupled to a bias voltage (Vbias). The level of this voltage can be selected by the skilled artisan and is used, in part, to keep the photo-diode 210 in reverse bias where the voltage at node 214 is lower than the diode supply voltage (Vdiode). If the voltage at node 214 exceeds Vbias by a source to gate voltage (vgs), charge in the photo-diode 210 is allowed to pass through the injection transistor 212 for accumulation by the integration capacitor 215.

Each reset event is accumulated (counted) with a digital counter circuit 235. At each frame, a "snapshot" of the contents of the digital counter circuit 235 is copied into a register or memory and read out, line by line. This digital pixel 200 operates to exponentially increase the well capacity ($Q_{INT}$) of the integration capacitor 215 by a factor of $2^N$, where N is the size of the digital counter circuit 235. Thus, by conserving the photo-charge relationship within a frame period, this type of read-out digital pixel 200 may achieve improved signal-to-noise ratio.

After the integration time expires, any residual charge accumulated on the integration capacitor 215 can be read out by, for example, a single slope ADC or any other type of ADC. Such operations are known in the prior art.

The example digital pixel 200 illustrated in FIG. 2 is an asynchronous circuit. In asynchronous in-pixel ADCs, the comparator reset event occurs as soon as the voltage on the integrating capacitor 215 crosses the comparator threshold Vref.

At the end of a frame, the amount of light can be read out of the counter 235 for each photo-diode by the ROIC 140 (FIG. 1).

As discussed generally above, vibration induces scene projection changes across the detection device 120 (e.g., across the FPA) such that light that was supposed to strike one photo-diode actually strikes another and can lead to a "count" in the counter of the wrong photo-diode within the single-frame integration period.

Herein disclosed are systems and methods that provide a solution to increase the band limit for motion that might be compensated for by using a digital pixel 200 combined with an accelerometer. The operation of a digital pixel 200 is discussed above with respect to FIG. 2.

In one embodiment, the systems and methods herein reduce image blur within the frame integration time due to relative motion between the FPA and imager optics. In one embodiment, the system includes an FPA formed of digital pixels that each include an integration capacitor 215 that generates an output each time it fills, an accelerometer such as a MicroElectroMechanical System (MEMS) accelerometer on or in the ROIC that produces acceleration data which can be used to determine relative FPA displacement, and a table or other implement that converts the instantaneous FPA displacement to position of the image projection (such as a look up table). With these components, each count of each pixel can be allocated to the pixel corresponding to the undisturbed FPA location based on relative FPA displacement at the moment the integration capacitor fills (e.g., at each counter increment).

In other words, each comparator reset event can be considered discretely by the ROIC 140 and associated with a relative scene position of the FPA as determined through data provided by the accelerometer. The final readout value for a specific pixel that corresponds to the total integration time for the frame may incorporate counts from comparator reset events on one or more other pixels in the array, based on scene motion over the total integration period.

Motion in a frequency band of interest for compensation, ~10 Hz-2 kHz, in one embodiment, can be measured with a MEMS accelerometer included in or connected to the ROIC 140. Only relative motion over the integration time is needed rather than absolute position, which would be more challenging to measure precisely.

Figure 3:
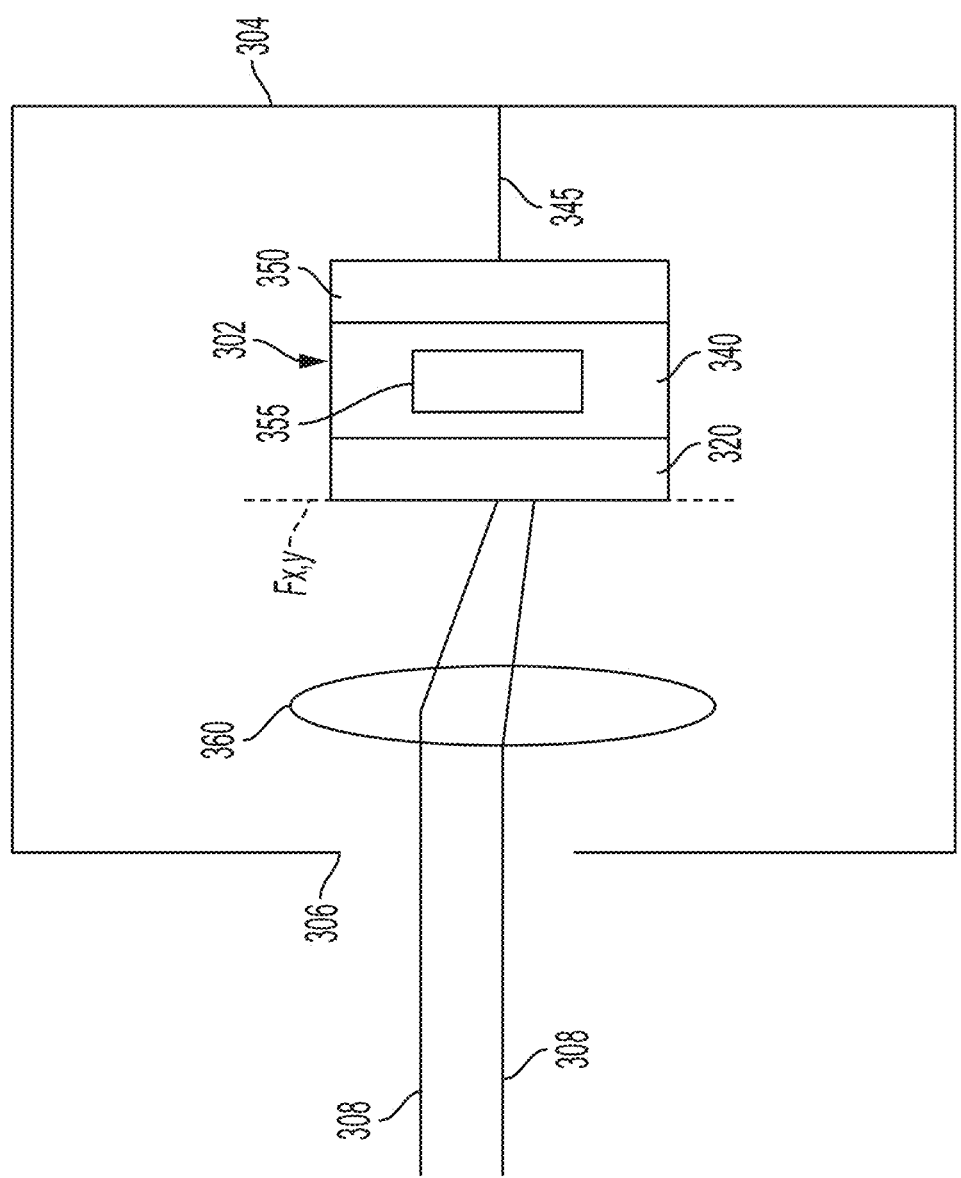
FIG. 3 is block diagram of an image detector of one embodiment carried by a vehicle.

With reference now to FIG. 3, an image detector 302 is shown connected to a platform 304. The image detector 302 includes some or all of the portions of the image detector 100 described above. As shown, the image detector 302 includes a detection device 320 that includes an array of digital pixels (described above in reference to FIG. 1) and a ROIC 340.

In FIG. 3 an accelerometer 350 is shown as being attached to the ROIC 340. However, the accelerometer 350 can be included in the ROIC 340 in one embodiment. The image detector 302 is shown as being connected to the vehicle 304 by a platform 345. Of course, other connection elements could be employed.

The platform 304 can be a satellite or other airborne apparatus such as an aircraft or any land- or sea-based tactical vehicle. The platform 304 also carries optics 360 that allow electromagnetic radiation 308 (e.g., light or IR radiation) that passes through an opening 306 in the platform 304 to be focused on the detection device 320. The optics 360 can be any type of optics that focus the electromagnetic radiation 308 on the detection device 320.

In one embodiment, the detection device 320 is a focal plane array (FPA) that is located at or on the focal plane of the optics 360. The instantaneous position of the FPA ($F_{x,y}$) may be displaced from the nominal position due to motion of the platform 304.

As discussed above, platform or other motion can cause the image detector 302 to move relative to the optics 360. Such motion can lead to the image projection ($P_{x,y}$) shifting on the focal plane according to the displacement ($F_{x,y}$) in the horizontal (X) and vertical (Y) directions. To correct for this, a lookup table based on a mated optical prescription that relates change in position of the image projection ($P_{x,y}$) as a function of the focal plane displacement ($F_{x,y}$) may be provided. The look up table can be stored in the ROIC 340 in one embodiment as is shown generally as element 355 in FIG. 3. The lookup table 355 can be based on the mated optical prescription $P_{x,y}(F_{x,y})$ in one embodiment.

Figure 4:
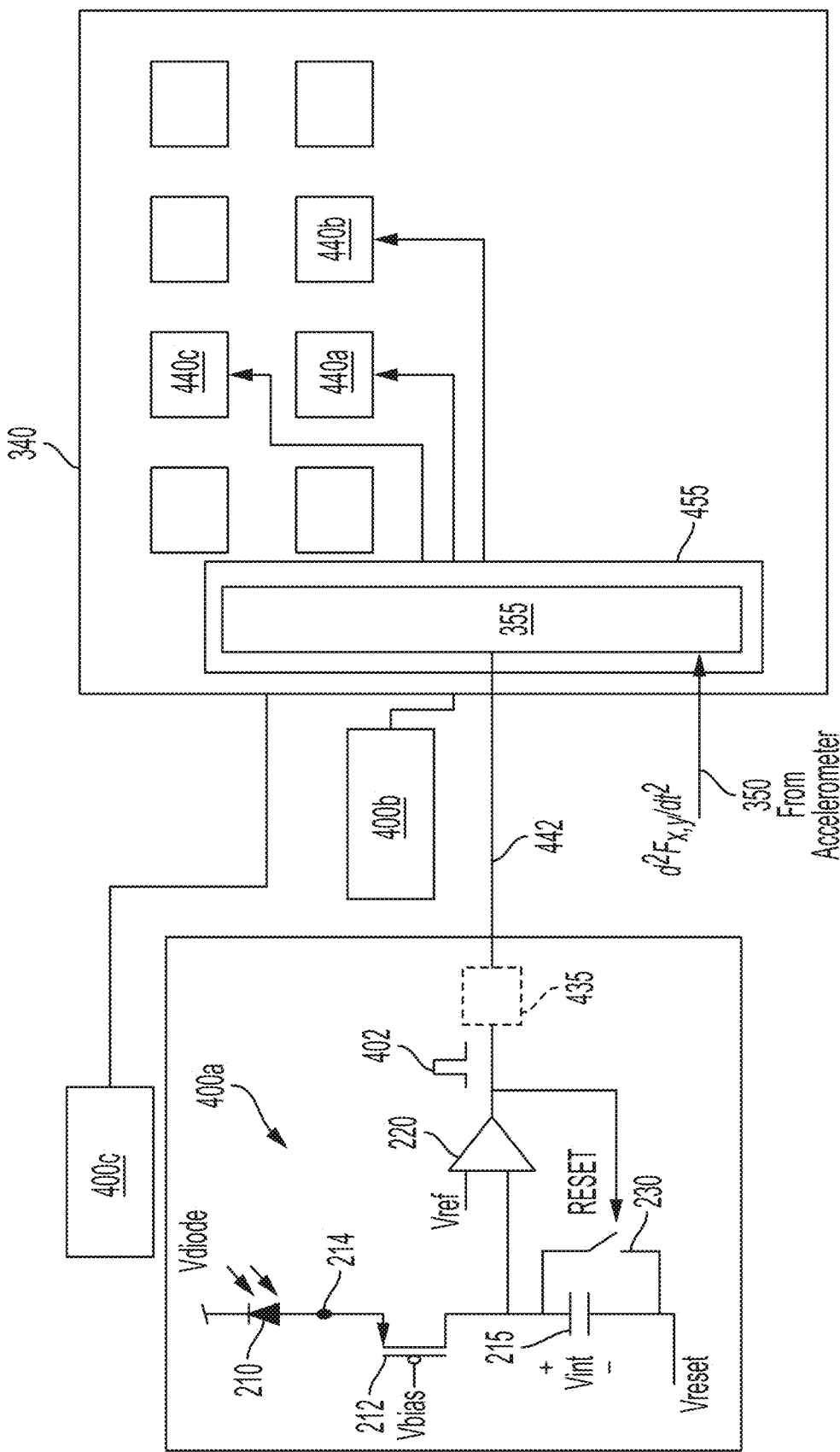
FIG. 4 is schematic diagram illustrating a digital pixel connected to a readout integrated circuit (ROIC) that assigns digital pixel outputs from one pixel to accumulators associated with another pixel.

With reference now to FIG. 4, a combination of a digital pixel 400a with a ROIC 340 according to one embodiment is illustrated. Also generally shown are other pixels (400b/400c) that can be included in array of digital pixels. That is, pixels 400a, 400b and 400c can all be in array. Of course, other digital pixels could be included as will be understood by the skilled artisan. While the following description focuses on digital pixel 400a, the other pixels can have the same elements and can interact with the ROIC 340 in the same manner.

The digital pixel 400a operates generally in the same manner as described above. However, the counter 435 is not required in this embodiment. It can optionally be replaced with a latch 435 or omitted. The following description applies to all pixels in the array (e.g., 400a-400c) and, as such, reference number 400 is used to refer to a general digital pixel.

As before, the comparator 220 of the digital pixel 400 will create a pulse 402 when Vint exceeds Vref. This pulse can optionally be latched by a counter or latch 435. Herein, the pulse 402 can also be referred to as a digital pixel output and is provided on output 442 of the digital pixel 400.

Regardless, the fact that the pulse 402 was created is provided to the ROIC 340. The ROIC 340 includes a plurality of accumulators 440, each of which is associated with a different pixel in the array. This is indicated in FIG. 4 where accumulator 440a is associated with pixel 400a, accumulator 440b is associated with pixel 400b, and so on. As such, the ROIC 340 is connected to the output of each of the digital pixels 400a-400c and receives the digital pixel output from each pixel.

The ROIC 340 can be configured to receive a digital pixel output (e.g., pulse 402) from a first digital pixel (e.g., digital pixel 400a) and transmit it to an accumulator associated with another digital pixel of the array based on information received from the accelerometer 350. To that end, the ROIC 340 can include a controller generally shown by reference numeral 455. The controller 455 can include the lookup table 355 in one embodiment, but the lookup table 355 could be stored in another location.

An example is instructive and refers to both FIG. 3 and FIG. 4. Assume that at a first time (t1) the first pixel 400a produces an output pulse 402, where t1 is assumed to be a time within a particular frame. At that instance, the controller 455 can query or otherwise acquire information from the accelerometer 350. This information, which can be in the form of $d^2F_{x,y}/dt^2$ will represent how much the focal plane is accelerating and, by extension from the mated optical prescription $P_{x,y}(F_{x,y})$, how far the image projection has moved on the imaging device due to current and preceding acceleration measurements. Suppose the controller 455 has determined that the image has moved down such that radiation striking the pixel 400a would have actually hit another pixel (e.g., pixel 400c) had there been no motion between the optics 360 and the image detector 302. In this case, the pulse 402 (or count) can be assigned to accumulator 440c that is associated with pixel 400c.

Now assume that at a second time (t2) the first pixel 400a produces another output pulse 402, where t2 is assumed to be a time within the same frame as t1. At that instance, the controller 455 can again query or otherwise acquire information from the accelerometer 350. Suppose now that the controller 455 has determined that the image has moved left such that radiation striking the pixel 400a would have actually hit another pixel (e.g., pixel 400b) had there been no motion between the optics 360 and the image detector 302. In this case, the pulse 402 (or count) can be assigned to accumulator 440b that is associated with pixel 400b.

In one embodiment, the accumulators 440 are counters. In this embodiment, each time a pulse 402 is assigned to a particular accumulator/counter, the counter is incremented.

Similar processing can occur each time any pixel generates an output pulse. This process can be repeated until the end of a frame at which time, the accumulators assigned to each pixel can be read out.

Figure 5:
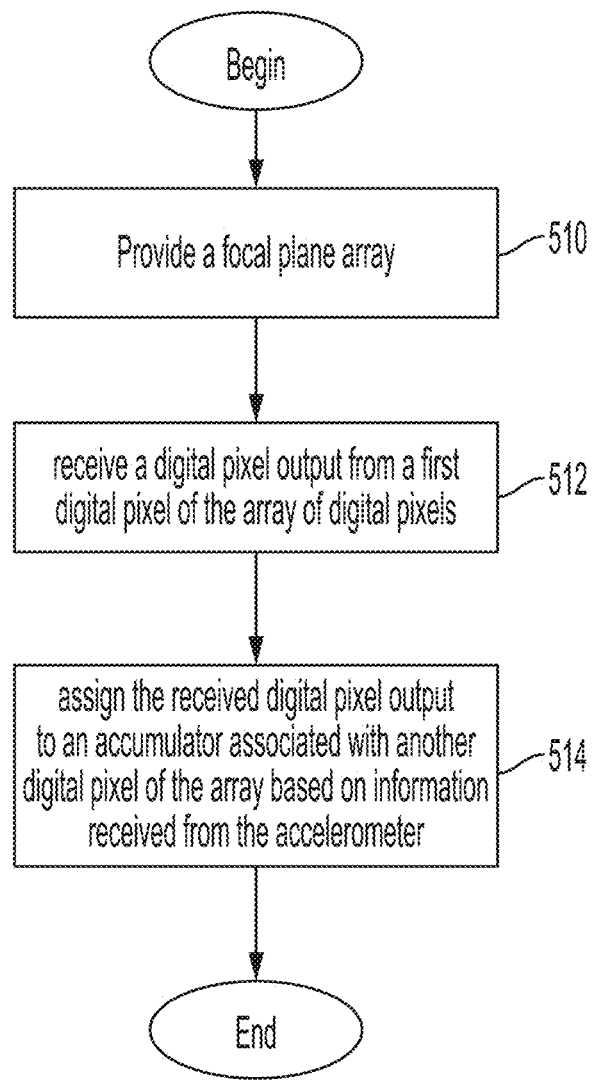
FIG. 5 is flow chart of a method according to one embodiment.

FIG. 5 is flow chart showing a method according to one embodiment. The method can be implemented in any of the systems described above. Reference is also made to FIG. 4 in the following description.

At block 510 a focal plane array that includes a plurality of digital pixels is provided. In one embodiment, each digital pixel includes an output 442 that provides a digital pixel output (pulse 402) each time a charge stored in the digital pixel 400 exceeds a threshold. The terms "digital pixel output" and pulse can be used interchangeably herein. The system can also include an accelerometer 350 connected to the focal plane array (e.g., image detection device 320 of FIG. 3). The ROIC 340 is connected to the output 442 of each of the digital pixels 400 and receives information from the accelerometer 350. In operation, as described above, the ROIC 340 receives the digital pixel output from each pixel and includes a plurality of accumulators 440 that are each associated with a respective digital pixel.

At block 512, a digital pixel output is received from a first digital pixel of the array of digital pixels. This output can be received by the ROIC 340 in one embodiment.

At block 514 the digital pixel output is assigned an accumulator associated with another digital pixel of the array based on information received from the accelerometer.

In one embodiment, assigning can include determining with a lookup table 355 to which accumulator 440 the received digital pixel output 442 is assigned. In one aspect of this embodiment, determining includes converting with a lookup table the information derived from the accelerometer to a change in position of an image projected on the image detection device. In another aspect, current and recent information received from the accelerometer, $d^2F_{x,y}/dt^2$, is used to determine the instantaneous position of the image detection device, $F_{x,y}$, and determining includes computing with the lookup table based on the mated optical prescription $P_{x,y}(F_{x,y})$ an image displacement at a time the digital pixel is received, wherein $P_{x,y}$ is the position of the image projected on the image detection device.

As discussed above, the accumulators 440 can be counters and assigning the received digital pixel output includes incrementing the accumulator to which the digital pixel output is assigned.

This method can be repeated multiple times during each image frame.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An imaging detector including: an image detection device that includes an array of digital pixels, each digital pixel including an output that provides a pulse each time a charge stored in the digital pixel exceeds a threshold; an accelerometer connected to the image detection device; and a readout integrated circuit (ROIC) connected to the accelerometer and connected to the output of each of the digital pixels and that receives pulses from each pixel, the ROIC including: a plurality of accumulators, each of the plurality of accumulators associated with a respective digital pixel; wherein the ROIC is configured to receive a pulse from a first digital pixel of the array of digital pixels and to assign the received pulse to an accumulator associated with another digital pixel of the array based on information received from the accelerometer.

2. The imaging device of claim 1, wherein the ROIC further includes:
 a lookup table that is used to determine to which accumulator the received pulse is assigned.

3. The imaging device of claim 2, wherein the lookup table converts information derived from the accelerometer to a change in position of an image projected on the image detection device.

4. The imaging device of claim 2, wherein current and recent measurements received from the accelerometer of $d^2F_{x,y}/dt^2$ are used to determine the instantaneous position of the image detection device, $F_{x,y}$, and determining includes computing with the lookup table based on the mated optical prescription $P_{x,y}(F_{x,y})$ an image displacement at a time the digital pixel is received, wherein $P_{x,y}$ is the position of the image projected on the image detection device.

5. The imaging device of claim 1, wherein the accumulators are counters.

6. The imaging device of claim 1, wherein the digital pixel includes:
 a photo-diode;
 an integration capacitor arranged to receive a photo-current from the photo-diode at an input and to store charge developed from the photo-current, the integration capacitor coupled between the input and a reset voltage; and
 a comparator coupled to the input that generates the digital pixel output when the stored charge exceeds the threshold.

7. The imaging device of claim 6, wherein the digital pixel includes an injection transistor disposed between the photo-diode and the integration capacitor that controls flow of the photo-current from the photo-diode to the integration capacitor, the injection transistor having a gate, a source electrically coupled to the photo-diode, and a drain electrically coupled to the integration capacitor at the input.

8. The imaging device of claim 1, wherein the accelerometer is a MicroElectroMechanical System device.

9. A method of operating an imaging device, the imaging device including: an image detection device that includes an array of digital pixels, each digital pixel including an output that provides a pulse each time a charge stored in the digital pixel exceeds a threshold, an accelerometer connected to the image detection device, and a controller connected to the accelerometer and connected to the output of each of the digital pixels and that receives the pulses from each pixel and that includes a plurality of accumulators, each of the plurality of accumulators associated with a respective digital pixel, the method comprising:
 receiving a digital pixel output from a first digital pixel of the array of digital pixels; and
 assigning the received digital pixel output to an accumulator associated with another digital pixel of the array based on information received from the accelerometer.

10. The method of claim 9, wherein the digital pixel output is received by a readout integrated circuit (ROIC).

11. The method of claim 9, wherein assigning includes:
 determining with a lookup table to which accumulator the received digital pixel output is assigned.

12. The method of claim 11, wherein determining includes:
 converting with the lookup table information derived from the accelerometer to a change in position of an image projected on the image detection device.

13. The method of claim 11, wherein the information received from the accelerometer is $d^2F_{x,y}/dt^2$, and wherein determining includes:
 converting with the lookup table based on the mated optical prescription $P_{x,y}(F_{x,y})$ to an image displacement at a time the digital pixel is received, wherein $F_{x,y}$ is the position of the image array relative to a nominal position and $P_{x,y}$ is the position of the image projected on the image detection device.

14. The method of claim 9, wherein the accumulators are counters and wherein assigning the received digital pixel output includes incrementing the accumulator to which the digital pixel output is assigned.

15. An imaging detector including: an image detection device that includes an array of digital pixels, each digital pixel including an output that provides a pulse each time a charge stored in the digital pixel exceeds a threshold; an accelerometer connected to the image detection device; and a readout integrated circuit (ROIC) including: a controller connected to the accelerometer and connected to the output of each of the digital pixels; and a plurality of accumulators connected to the controller, each of the plurality of accumulators associated with a respective digital pixel; wherein the controller is configured to receive a pulse from a first digital pixel of the array of digital pixels and to assign the received pulse to an accumulator associated with another digital pixel of the array based on information received from the accelerometer.

16. The imaging device of claim 15, wherein controller further includes:

a lookup table that is used to determine to which accumulator the received pulse is assigned.

17. The imaging device of claim 16, wherein the lookup table converts the information derived from the accelerometer to a change in position of an image projected on the image detection device.

18. The imaging device of claim 16, wherein current and recent measurements received from the accelerometer of $d^2F_{x,y}/dt^2$ are used to determine the instantaneous position of the image detection device, $F_{x,y}$, and determining includes computing with the lookup table based on the mated optical prescription $P_{x,y}(F_{x,y})$ an image displacement at a time the digital pixel is received, wherein $P_{x,y}$ is the position of the image projected on the image detection device.

19. The imaging device of claim 18, wherein the accumulators are counters.

20. The imaging device of claim 15, wherein the accelerometer is a MicroElectroMechanical System device.

* * * * *